US006770989B2

(12) United States Patent
Miyagawa et al.

(10) Patent No.: US 6,770,989 B2
(45) Date of Patent: Aug. 3, 2004

(54) LINEAR MOTOR HAVING AN IMPROVED STATOR AND SHIFTER

(75) Inventors: Naoomi Miyagawa, Gifu-ken (JP); Toshihiko Inoue, Aichi-ken (JP)

(73) Assignee: Tsunehiko Yamazaki, Gifu-ken (JP)

( * ) Notice: Subject to any disclaimer, the term of this patent is extended or adjusted under 35 U.S.C. 154(b) by 0 days.

(21) Appl. No.: 10/317,627

(22) Filed: Dec. 12, 2002

(65) Prior Publication Data

US 2003/0111914 A1 Jun. 19, 2003

(30) Foreign Application Priority Data

Dec. 17, 2001 (JP) ........................................ 2001-382729

(51) Int. Cl.$^7$ .............................................. H02K 41/02
(52) U.S. Cl. ........................................ 310/12; 310/216
(58) Field of Search ............................. 310/12, 13, 14, 310/216

(56) References Cited

U.S. PATENT DOCUMENTS

| | | | | |
|---|---|---|---|---|
| 5,959,374 A | * | 9/1999 | Anderson | 310/13 |
| 5,990,583 A | * | 11/1999 | Nanba et al. | 310/12 |
| 6,008,552 A | * | 12/1999 | Yagoto et al. | 310/12 |
| 6,040,642 A | * | 3/2000 | Ishiyama | 310/12 |

FOREIGN PATENT DOCUMENTS

| | | | | |
|---|---|---|---|---|
| GB | 2079068 | * | 5/1981 | H02K/41/03 |
| JP | 11-225468 | * | 8/1999 | H02K/41/03 |
| JP | 2001286122 A | | 10/2001 | H02K/41/03 |
| JP | 2002095232 A | | 3/2002 | H02K/41/03 |
| WO | WO 02 082619 A | | 10/2002 | H02K/3/493 |

OTHER PUBLICATIONS

Partial European Search Report for Ep 02 02 7387, issued on Feb. 27, 2003, in Munich, by EPO.
Patent Abstracts of Japan, vol. 2002,No. 7, Jul. 3,2002,& JP 2002 095282A, (Yaskawa Elec. Corp.) Mar. 29, 2002, Abstract, Figures 1–3.
Patent Abstracts of Japan, vol. 2002,No. 2, Apr. 2, 2002 & JP 2001,286122A (Sanyo Denki Co., Ltd.) Oct. 12, 2001, Abstract, Figure, 1,2,4.
International Search Report for WO 02 082619A.

* cited by examiner

Primary Examiner—Karl Tamai
(74) Attorney, Agent, or Firm—Duane Morris LLP

(57) ABSTRACT

A linear motor has a support portion 311 laterally bridged between a plurality of armatures 30 and a shifter side base portion 33 located on a shifter 3 side, for moving along a stator 2 in such a state that a distance between the shifter side base portion and the stator 2 is almost constantly maintained, and the support portion 311 is supported by the shifter side base portion 33 so as to determine a gap between the armature 30 and a magnet 20. Then, the gap between the armature 30 and the magnet 20 of the stator 2 is properly maintained.

4 Claims, 10 Drawing Sheets

F I G. 8
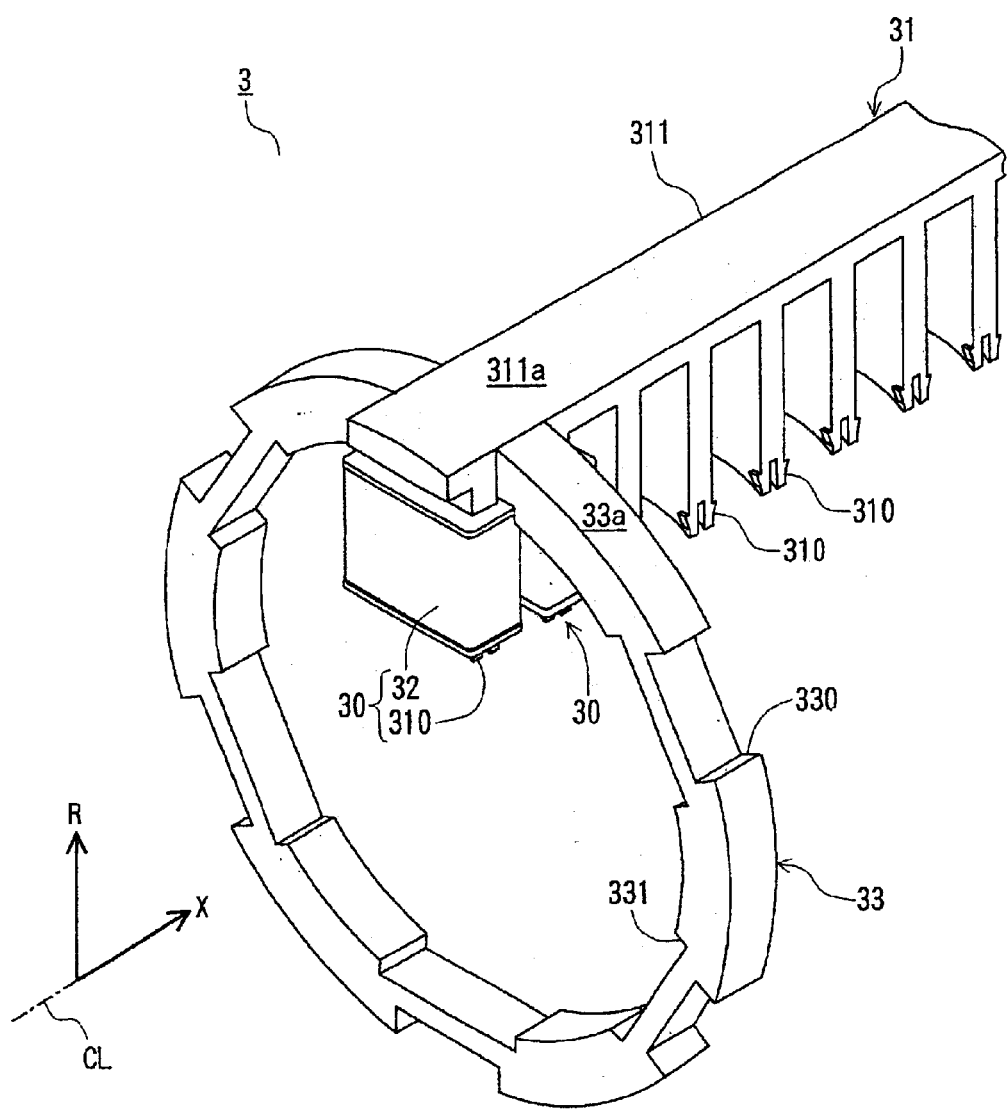

LINEAR MOTOR HAVING AN IMPROVED STATOR AND SHIFTER

BACKGROUND OF THE INVENTION

The present invention relates to a linear motor having a slender long stator and a shifter located so as to face the stator, for moving the shifter making use of suction or resiliency generated between an armature and a propulsion magnet.

The known conventional linear motor has a stator in the shape of almost bar having permanent magnets and a shifter having armatures, located so as to face the stator. In such a linear motor, suction or resiliency is successively generated between the armature and the permanent magnet by switching voltage applied on the armature so as to move the shifter along the stator.

In the linear motor having such structure, it is necessary to hold the armature at a regular position and to constantly maintain a micro-gap between the armature and the permanent magnet.

Then, the developments of the linear motor by which the armature can be held at a regular position are still awaited.

SUMMARY OF THE INVENTION

The present invention is linear motor having a slender long stator, a shifter located so as to face said stator, a plurality of magnets located on said stator side and a plurality of armatures located on said shifter side so as to face said magnets, for moving said shifter along said stator by switching voltage applied on said armature, said linear motor comprising:

a support portion laterally bridged between a plurality of said armatures; and a shifter side base portion located on said shifter side, for moving along said stator in such a state that a distance between said shifter side base portion and said stator is almost constantly maintained together with a movement of said shifter; whereby said support portion is supported by said shifter side base portion so as to determine a gap between said armature and said magnet.

According to this invention, the gap between the armature and the magnet is properly maintained since the support portion laterally bridged between a plurality of the armatures is supported by the shifter side base portion although a force is generated between the armature and the magnet.

The present invention is the linear motor wherein a ditch portion is formed on a face of a side opposite to a side where said magnet is located on in said shifter side base portion, and said support portion is supported by said shifter side base portion in the state of being fitted in said ditch portion.

According to this invention, the distance between both support portions adjacent to each other of a plurality of the support portions can be properly maintained since the support portion is supported by the shifter side base portion in the state of being fitted in the ditch portion. Besides, the work, such as the work for drying is not necessary, different from the case where an adhesive is used so as to make the attachment work easy and so as to reduce the assembly error.

The present invention is the linear motor, wherein said support portion forms a continuous face with said shifter side base portion by being fitted in said ditch portion.

According to this invention, the support portion forms a continuous face with the shifter side base portion by being fitted in the ditch portion. Therefore, the interference between the outer peripheral face of the support portion or the shifter side base portion and the case can be extremely reduced even if the support portion and the shifter side base portion are stored in the case so as to assemble the shifter. Therefore, assembly work can be made easier.

The present invention is the linear motor, wherein said armature is comprised of an iron core portion provided so as to elongate from said support portion so as to closely approach said magnet and a coil fitted on said iron core portion, a projecting portion is formed at a top end portion of said iron core portion, and said coil is held so as not to be pulled out by said projecting portion.

According to this invention, the coil is held so as not to be pulled out of the iron core portion by the projecting portion. Then, the work, such as the work for drying is not necessary, different from the case where an adhesive is used so as to make the attachment work easy and so as to reduce the assembly error.

The present invention is the linear motor, wherein said shifter is in the shape of a cylinder and is fitted on the stator with a play, a plurality of magnets are symmetrically located with respect to a central axis of said stator, said armatures are symmetrically located with respect to said central axis so as to respectively face said magnets, said shifter side base portion is an annular member with said central axis as its center, and said shifter side base portion moves along said stator in such a state that a distance between said shifter side base portion and said stator is almost constantly maintained by balance of a force added by a plurality of said armatures symmetrically located with respect to said central axis.

According to this invention, the shifter is in the shape of a cylinder and is fitted on the stator with a play, a plurality of magnets are symmetrically located with respect to a central axis of the stator, the armatures are symmetrically located with respect to the central axis so as to respectively face the magnets, the shifter side base portion is an annular member with the central axis as its center, and the shifter side base portion moves along the stator in such a state that a distance between the shifter side base portion and the stator is almost constantly maintained by balance of a force added by a plurality of the armatures symmetrically located with respect to the central axis, thereby the gap between the armature and the magnet is properly maintained even if the linear motor has such a structure. Even if the magnetic force of the permanent magnet is strong or many armatures are provided in this case, the force can be compensated in the shifter side base portion, and all gaps between the armature and the magnet can be properly maintained.

The present invention is the linear motor, wherein a ditch portion is formed on an outer peripheral side of said shifter side base portion, and said support portion is supported by said shifter side base portion in the state of being fitted in said ditch portion.

According to this invention, the position of the shifter side base portion in the peripheral direction concerning the support portion can be properly determined. Besides, the work, such as the work for drying is not necessary, different from the case where an adhesive is used so as to make the attachment work easy and so as to reduce the assembly error.

The present invention is the linear motor, wherein said support portion forms a continuous face with said shifter side base portion by being fitted in said ditch portion.

According to this invention, the support portion forms a continuous face with the shifter side base portion by being fitted in the ditch portion. Therefore, the interference between the outer peripheral face of the support portion or the shifter side base portion and the case can be extremely reduced even if the support portion and the shifter side base portion are stored in the case so as to assemble the shifter. Therefore, assembly work can be made easier.

The present invention is the linear motor, wherein said armature is comprised of an iron core portion provided so as to elongate from said support portion so as to closely approach said magnet and a coil fitted on said iron core portion, a projecting portion is formed at a top end portion of said iron core portion, and said coil is held so as not to be pulled out by said projecting portion.

According to this invention, the coil is held so as not to be pulled out of the iron core portion by the projecting portion. Then, the work, such as the work for drying is not necessary, different from the case where an adhesive is used so as to make the attachment work easy and so as to reduce the assembly error.

BRIEF DESCRIPTION OF THE DRAWINGS

FIG. 8 is a perspective view for showing the structure of the shifter.

DESCRIPTION OF THE PREFERRED EMBODIMENTS

An embodiment of the present invention will now be explained hereinafter, referring to drawings.

Figure 1:
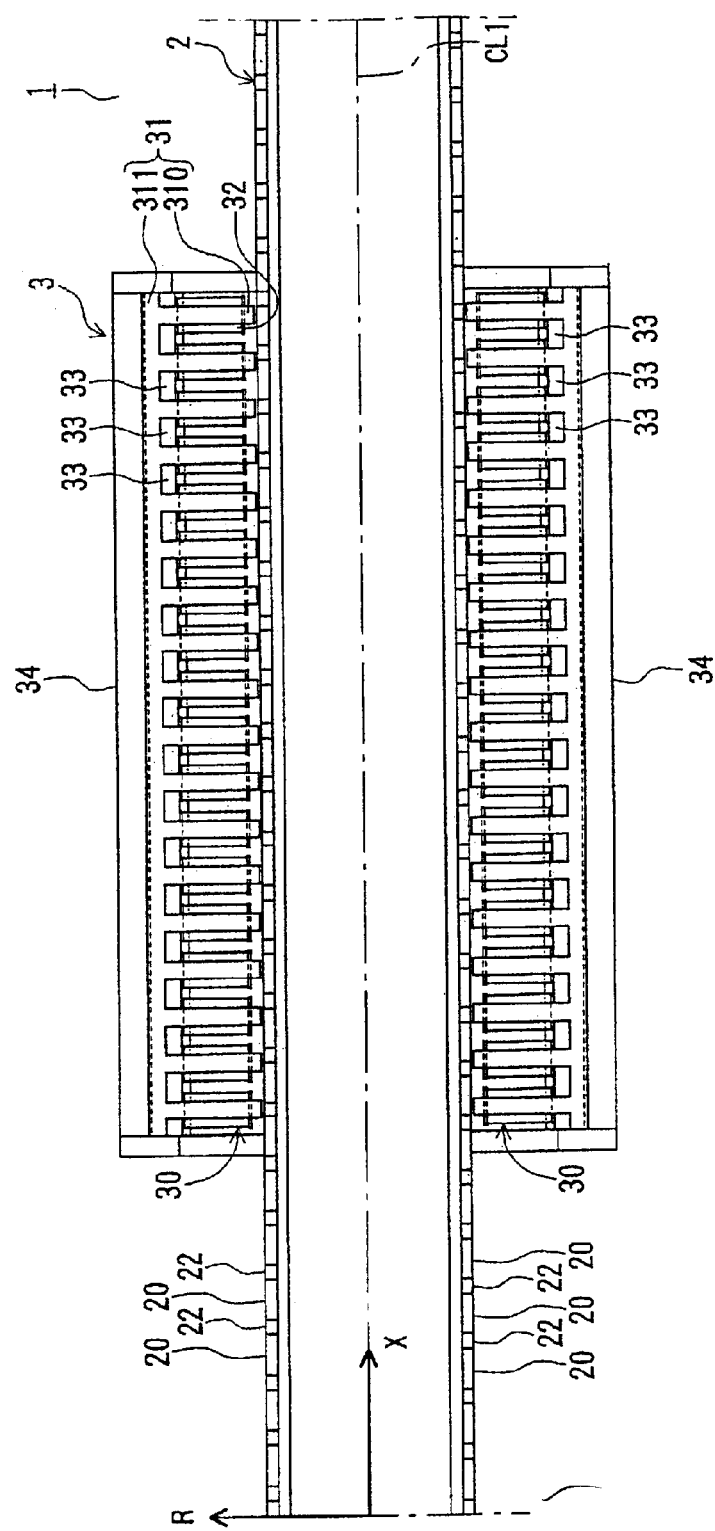
FIG. 1 is a longitudinal section for showing the whole structure of a linear motor according to the present invention.
Figure 2:
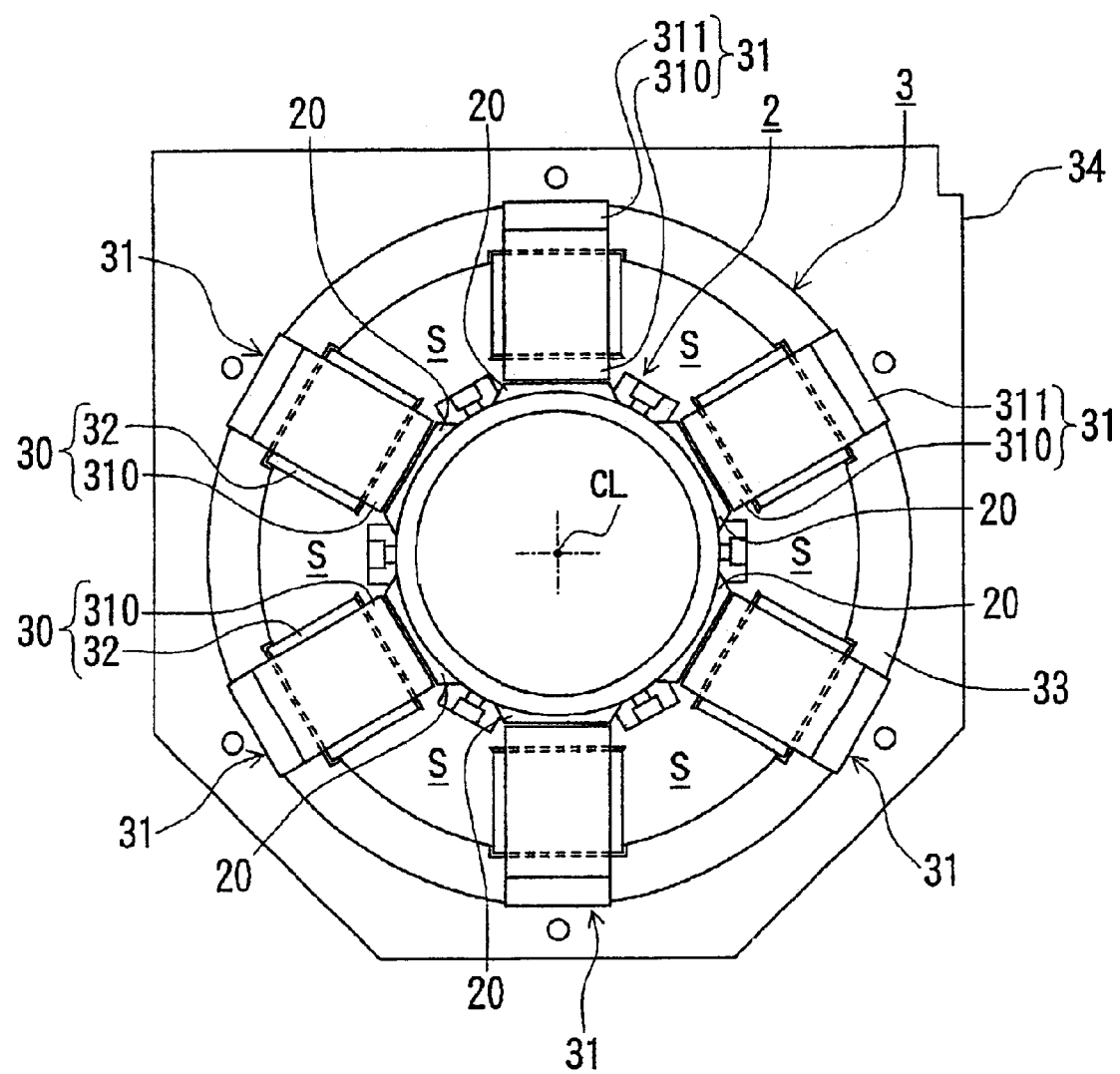
FIG. 2 is a lateral section for showing a structure of the linear motor according to the present invention.

At first, the whole structure of a linear motor according to the present invention will now be explained, referring to FIG. 1 and FIG. 2. FIG. 1 is a longitudinal section for showing the whole structure of a linear motor according to the present invention, and FIG. 2 is a lateral section for showing a structure of the linear motor according to the present invention.

As shown in FIG. 1, a linear motor 1 according to the present invention has a stator 2 having thin and long shape (almost bar shape) and a cylindrical shifter 3 fitted on the stator 2 having a play so as to be free to move. A plurality of permanent magnets 20 are located on the stator 2 along its axial direction x (that is, a direction of moving the shifter 3), and a plurality of armatures 30 are located on the shifter 3 so as to respectively face the permanent magnets 20 locating extremely small distance therebetween. Then, the shifter 3 can be moved along the stator 2 by switching the voltage applied on the armature 30.

Figure 3:
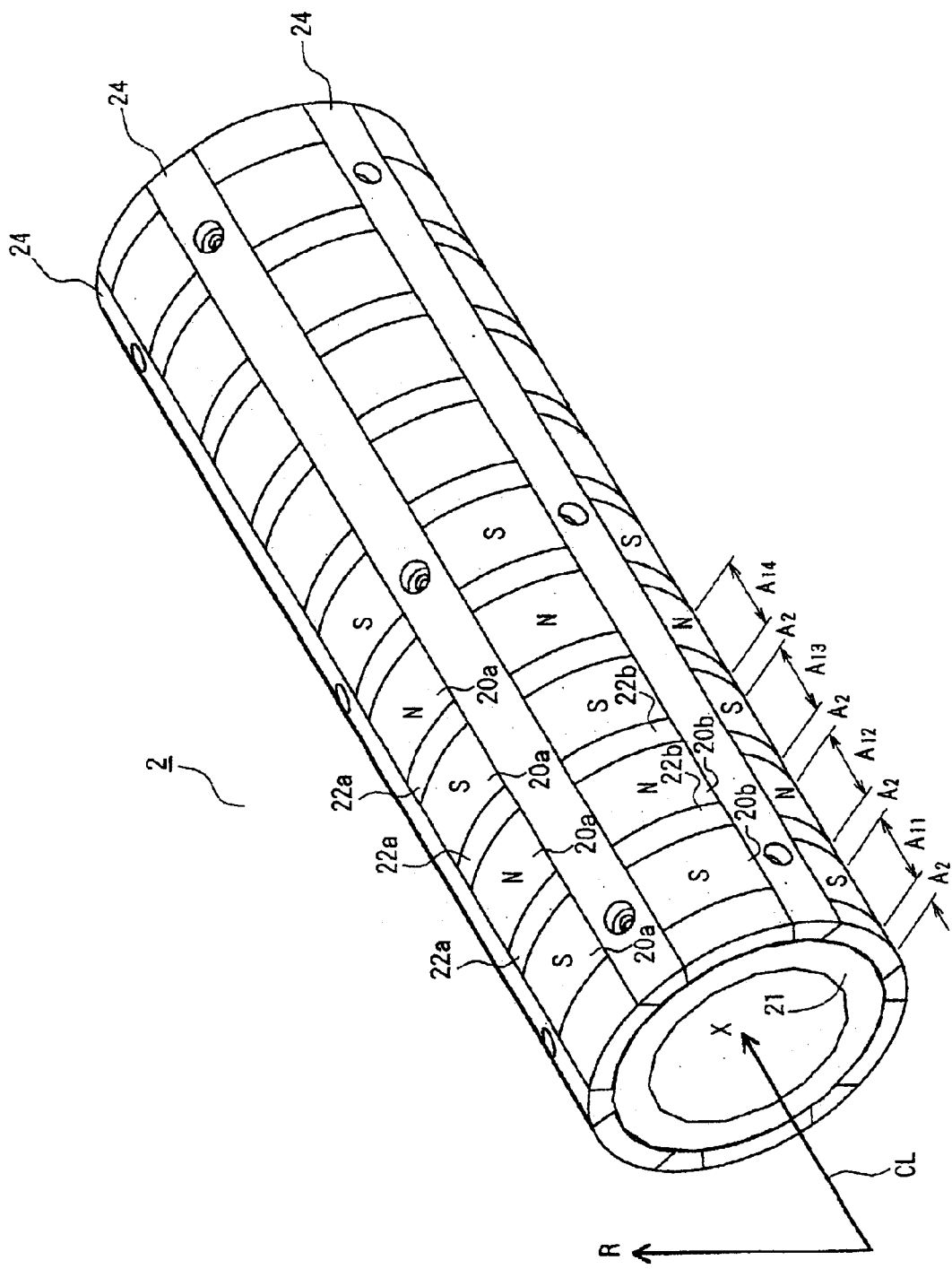
FIG. 3 is a perspective view for showing appearances of a stator.
Figure 5:
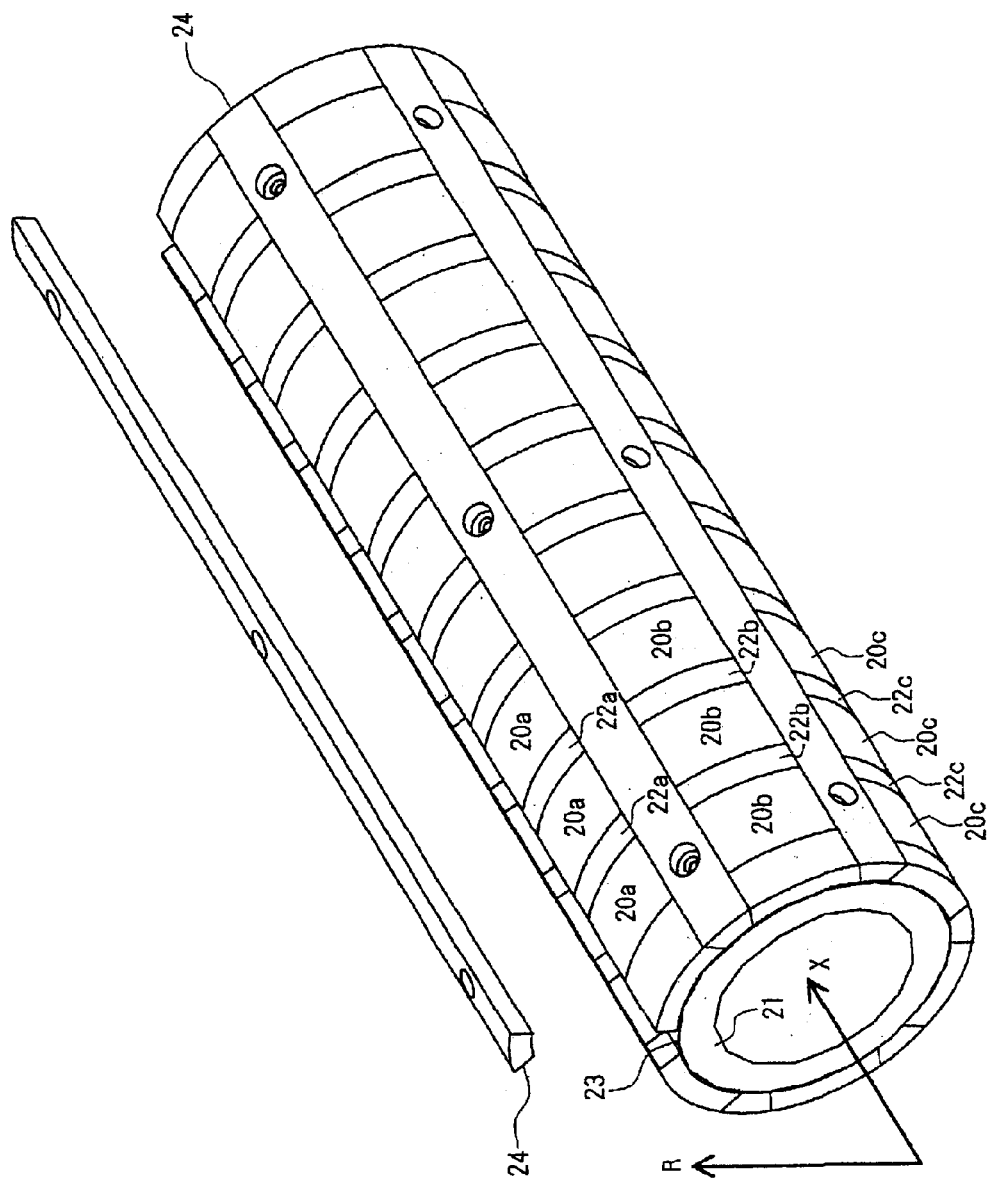
FIG. 5 is an exploded perspective view for explaining a state of attaching of a fixing bar.
Figure 6:
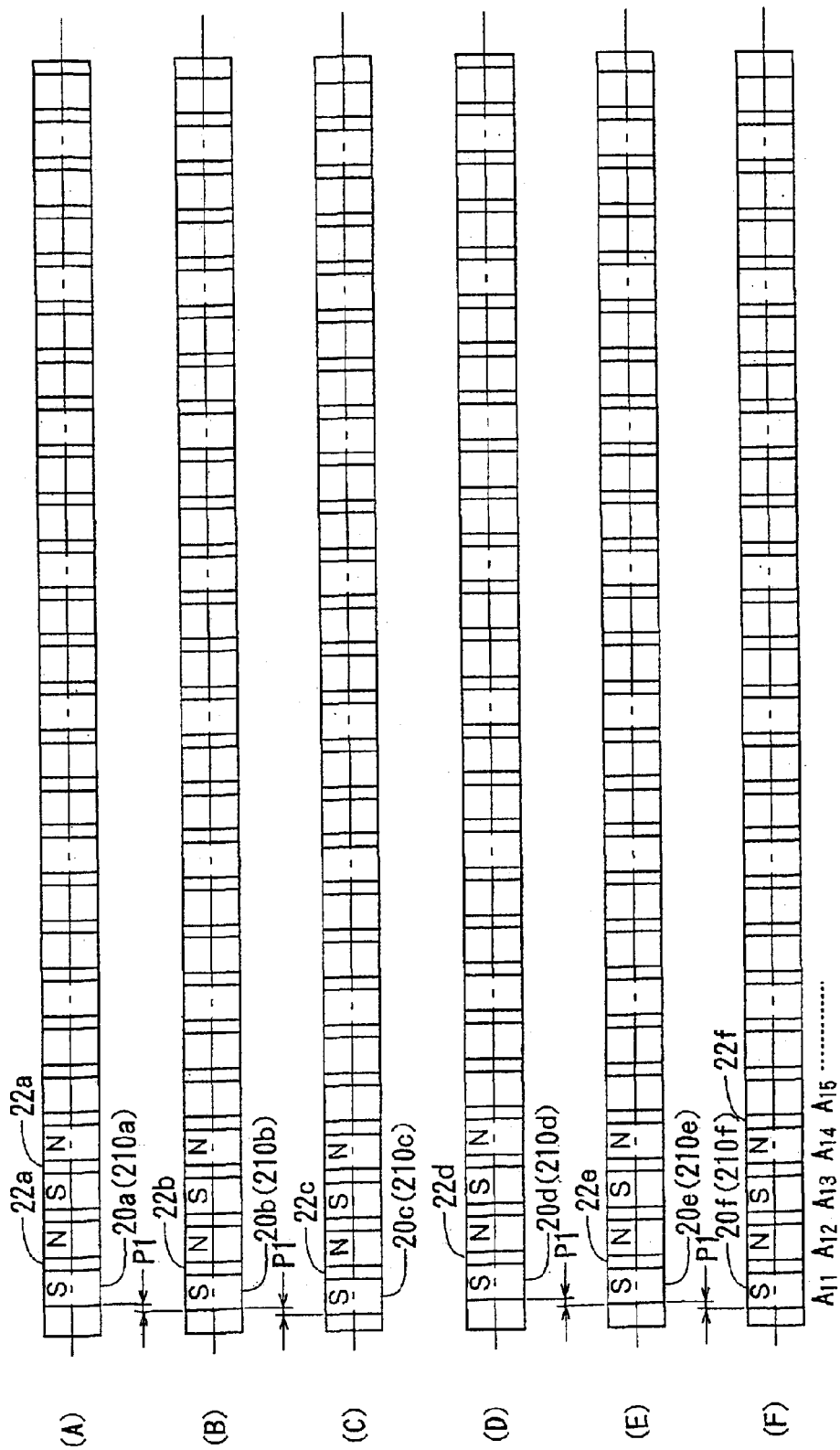
FIG. 6 is a typical view for explaining positions of location of permanent magnets.

Subsequently, the detailed structure of the stator 2 will now be explained, referring to FIG. 3 through FIG. 6. FIG. 3 is a perspective view for showing appearances of the stator, FIG. 4 is a perspective view for showing appearances of a stator side base portion, FIG. 5 is an exploded perspective view for explaining a state of attaching of a fixing bar, and FIG. 6 is a typical view for explaining positions of location of permanent magnets.

Figure 4:
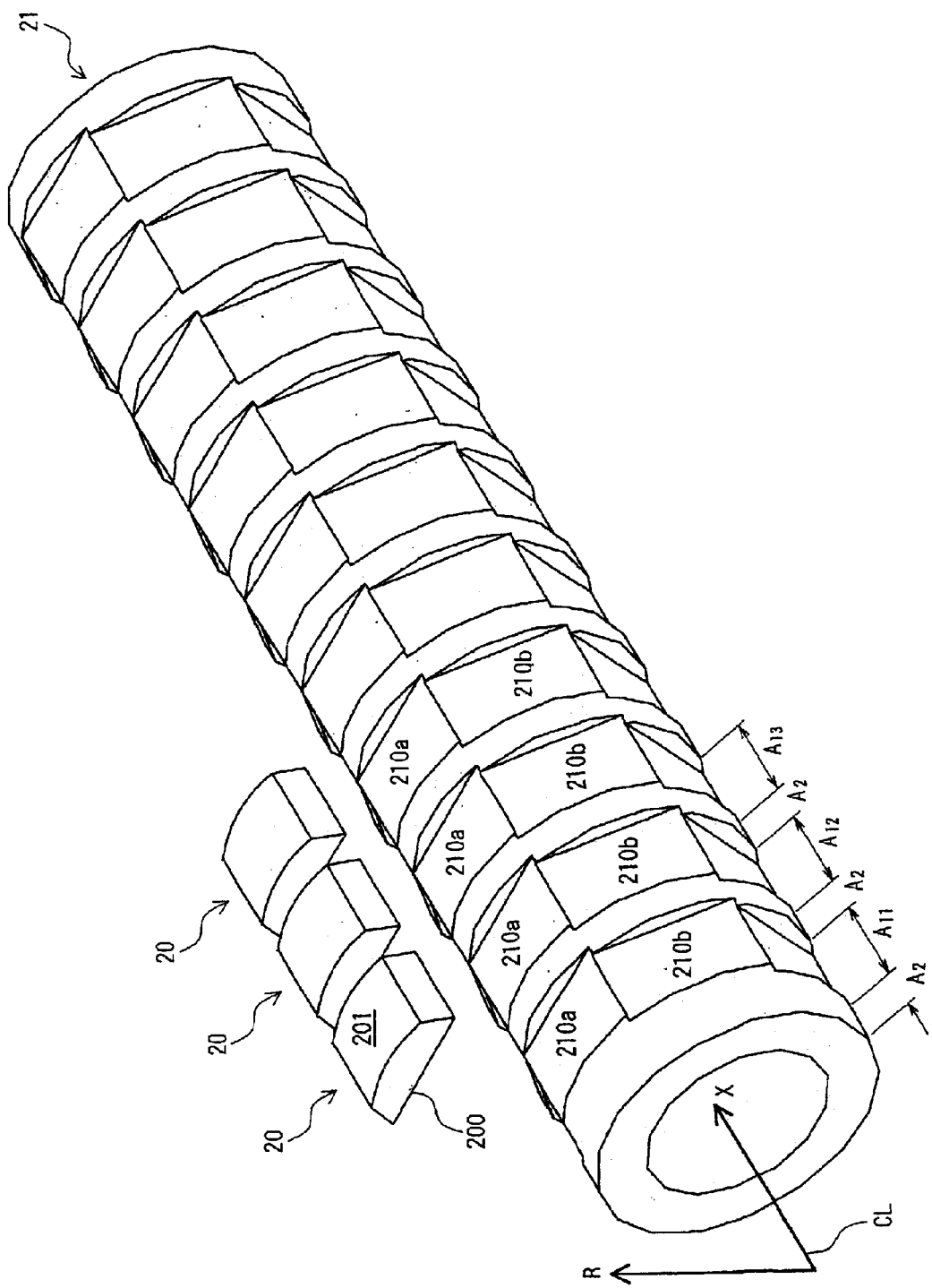
FIG. 4 is a perspective view for showing appearances of a stator side base portion.

The stator 2 has a slender stator side base portion 21 having cylindrical shape, as shown in FIGS. 3 and 4. The stator side base portion 21 has such a shape that a portion having almost hexagonal pole appearance in which the outer peripheral face is comprised of six plane portions $210a$, $210b$, . . . . . . (A plurality of the portions are located along the axial direction X as shown by $A_{11}, A_{12}, A_{13}, $ . . . . . . in FIG. 3, but the portion will be explained with only "$A_1$" if these portions are not necessary to be specifically identified. On this occasion, the portion is for installing the magnet 20 as described next, thereby the portion is referred to as "magnet installation portion", hereinafter) and a portion $A_2$ having almost cylinder appearance ("annular portion $A_2$" hereinafter) are alternately located.

And, the permanent magnets 20 (When it is necessary to differentiate one permanent magnet from another of the permanent magnets to be installed on the plane portions $210a$, $210b$, . . . , the marks $20a$, $20b$, . . . . . . are used for identification, and only the mark 20 is used if it is not necessary to differentiate.) are respectively located on the plane portions $210a$, $210b$, . . . . . . . At the result, six permanent magnets 20 are radially located, symmetry with respect to the center axis CL of the stator 2 in one magnet installation portion $A_1$ (see FIG. 2), and the permanent magnets 20 are located at a constant pitch in the axial direction x of the stator 2 (see FIG. 3).

Such magnet 20 is comprised in such a way that the side of the plane portion $210a$, $210b$ . . . . . . which the magnet 20 is installed on is a flat face (see mark 200 of FIG. 4. It is referred to as "installed face", hereinafter) almost the same as the size of the plane portion $210a$, $210b$ . . . . . . , and the opposite side (see mark 201. It is referred to as "outer peripheral face", hereinafter) forms a part of the cylindrical outer peripheral face. On this occasion, each magnet 20 is magnetized in such a way that magnetic poles of the installed face 200 and the outer peripheral face 201 are different from each other. Concerning six permanent magnets $20a$, $20b$, . . . . . . located on one magnet installation portion $A_1$, the magnetic poles of the outer peripheral face 201 are all the same. And, the magnetic poles of the outer peripheral face 201 are alternately switched, such as S-N-S-N-S-N in the axial direction X. That is, in the stator 2 as shown in FIG. 3, the magnetic poles of the outer peripheral face 201 are all S poles in the magnet installation portion as shown in the mark $A_{11}$, the magnetic poles of the outer peripheral face 201 are all N poles in the magnet installation portion as shown in the mark $A_{12}$, the magnetic poles of the outer peripheral face 201 are all S poles in the magnet installation portion as shown in the mark $A_{13}$, and the magnetic poles of the outer peripheral face 201 are all N poles in the magnet installation portion as shown in the mark $A_{14}$. The permanent magnets 20 are arranged in this way, thereby two magnets adjacent to each other in the axial direction x pull each other. Then, it is easy to attach the magnet 20 to the stator side base portion 21, and it is easy to assemble the stator 2.

The three plane portions $210a$, $210b$, $210c$ (and the magnets $20a$, $20b$, $20c$ respectively installed on the plane portions $210a$, $210b$, $210c$) adjacent to each other in the peripheral direction in one magnet installation portion $A_1$ are located so as to shift at a constant pitch $p_1$ in the axial direction x, as detailedly shown in FIG. 6, and remaining three plane portions 210d, 210e, 210f (and the magnets 20d, 20e, 20f respectively installed on the plane portions 210d, 210e, 210f) are also located so as to shift at a constant pitch $p_1$ in the axial direction. Furthermore, both plane portions (the plane portions 210a and 210d, the plane portions 210b and 210e and the plane portions 210c and 210f) located at the angle of 180° with the central axis CL of the stator 2 as its center are located so as not to shift in the axial direction x (so as to correspond the positions of the axial direction x with each other).

A spacer 22 is located on the annular portion $A_2$ so as to fill up the gap between the magnets 20, 20 arranged in the axial direction X, as shown in FIGS. 3, 5 and FIG. 6 (Such spacer is arranged between the magnets 20a and 20a, between the magnets 20b and 20b, between the magnets 20c and 20c, between the magnets 20d and 20d, between the magnets 20e and 20e, between the magnets 20f and 20f. When it is necessary to differentiate these spacers from each other, the number 22a, 22b . . . . . . are attached to the spacer, and when it is not necessary to differentiated these from each other, only the number 22 is attached to this spacer.).

That is, the permanent magnet 20 and the spacer 22 are alternately arranged in the axial direction x of the stator 2, as shown FIG. 3 and FIG. 5. The end face of the permanent magnet 20 or the spacer 22 (the end face in the peripheral direction) forms an almost plane portion, slender and long along in the axial direction x, and a ditch portion (see number 23 of FIG. 5) is formed between both end faces facing each other (the end face in the peripheral direction of the permanent magnet 20a or the spacer 22a and the end face in the peripheral direction of the permanent magnet 20b or the spacer 22b, for instance). Such ditch portion 23 has a cross section shape in which the inner peripheral side is narrow and the outer peripheral side is wide, and six ditches are radially formed at the outer peripheral face of the stator side base portion 21. And, a fixing bar 24 having a section in the shape of a wedge in which the inner peripheral side is narrow and the outer peripheral side is wide is attached in this ditch portion 23 by screws. Since the ditch portion 23 and the fixing bar 24 have a cross section shape as mentioned above, the fixing bar 24 installed in the ditch portion 23 fills the roll of pushing both end faces of the permanent magnet 20 or the spacer 22 (both end faces in the peripheral direction) on the stator side base portion 21 and fixing these.

On this occasion, the outer peripheral faces of the spacer 22 and the fixing bar 24 are curved with the curvature the same as the outer peripheral face 21 of the permanent magnet 20 so as to form one cylindrical outer peripheral face (see FIG. 3).

Figure 7:
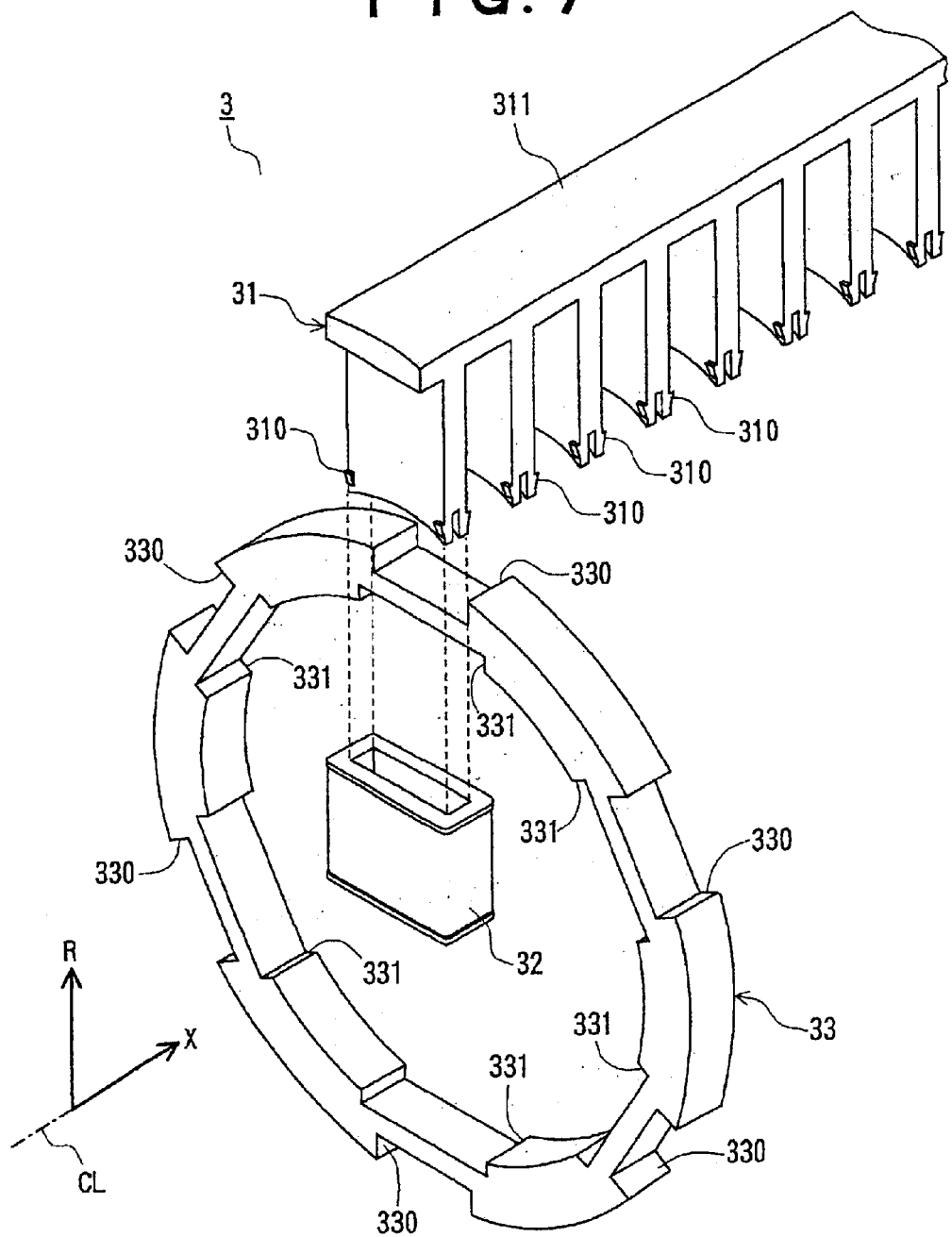
FIG. 7 is an exploded perspective view for showing a structure of a shifter.

Subsequently, the structure of the shifter 3 will now be explained, referring to FIGS. 7 through 10. FIG. 7 is an exploded perspective view for showing the structure of the shifter, FIG. 8 is a perspective view for showing the structure of the shifter, FIG. 9 is a perspective view for showing detailed shape of the armature, and FIG. 10 is an exploded perspective view for explaining a state of assembly of the armature.

The shifter 3 has six iron core members 31, as shown in FIG. 2, and these six iron core members 31 are arranged so as to face six magnet rows 20a, . . . , 20b, . . . , 20c, . . . , 20d, . . . , 20e, . . . , 20f, . . . , on the stator side. Each iron core member 31 has a comb shape, comprised of a support portion 311 arranged along the axial direction X ("back portion" hereinafter) and a plurality of iron core portions 310 formed from the back portion 311 for the central axis CL, as shown in FIGS. 1 and 7. A coil 32 is fixed on each iron core portion 310 such that the armature 30 can be comprised of the iron core portion 310 and the coil 32, as shown in FIG. 8. That is, the back portion 311 as the support portion is located in the state of being laterally bridged between a plurality of the armatures 30, as shown in FIG. 7 and FIG. 8. In FIG. 7 and FIG. 8, only one of the six iron core members 31 is shown. And, only one coil 32 is shown in FIG. 7 and only two armatures 30 are shown in FIG. 8.

Figure 9:
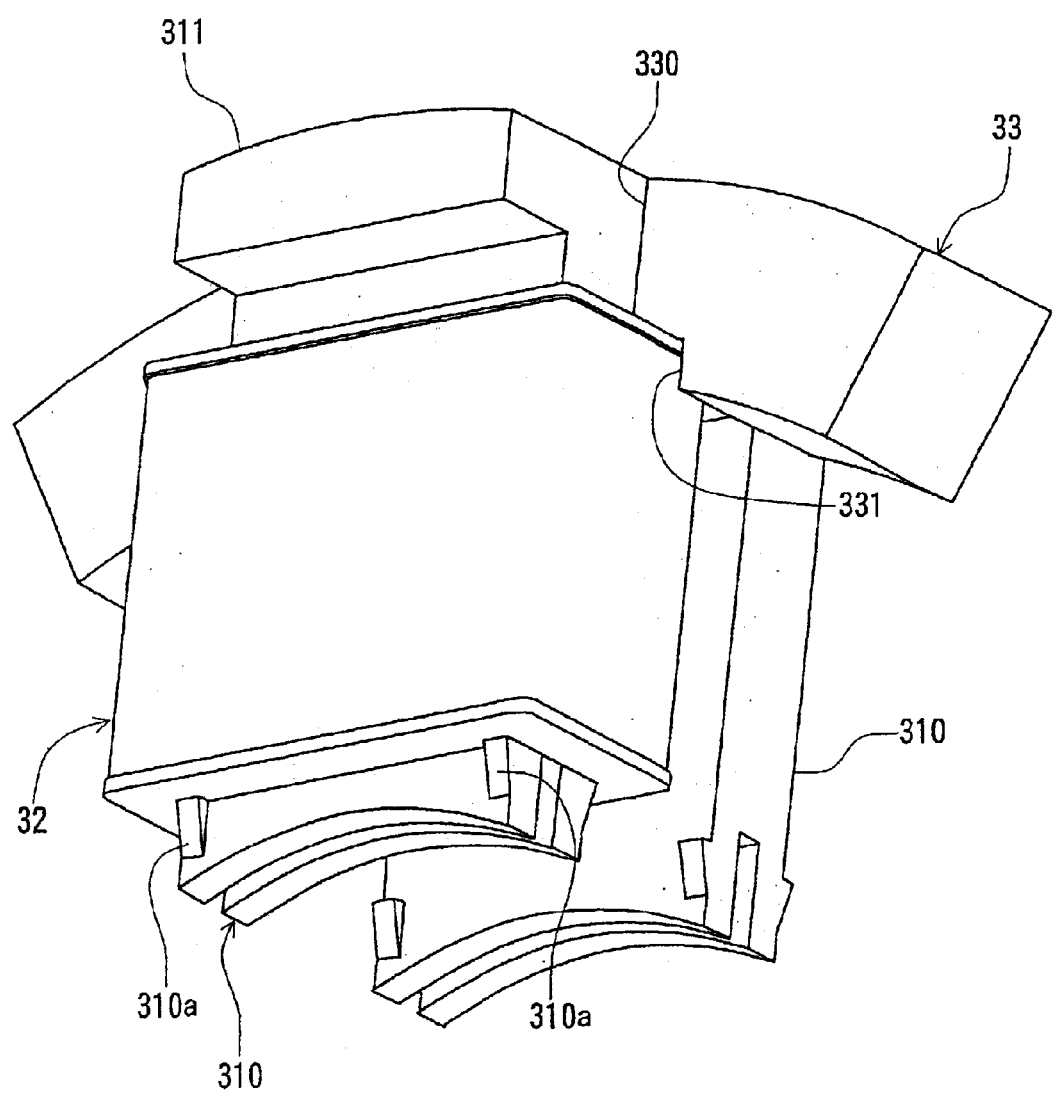
FIG. 9 is a perspective view for showing detailed shape of an armature.
Figure 10:
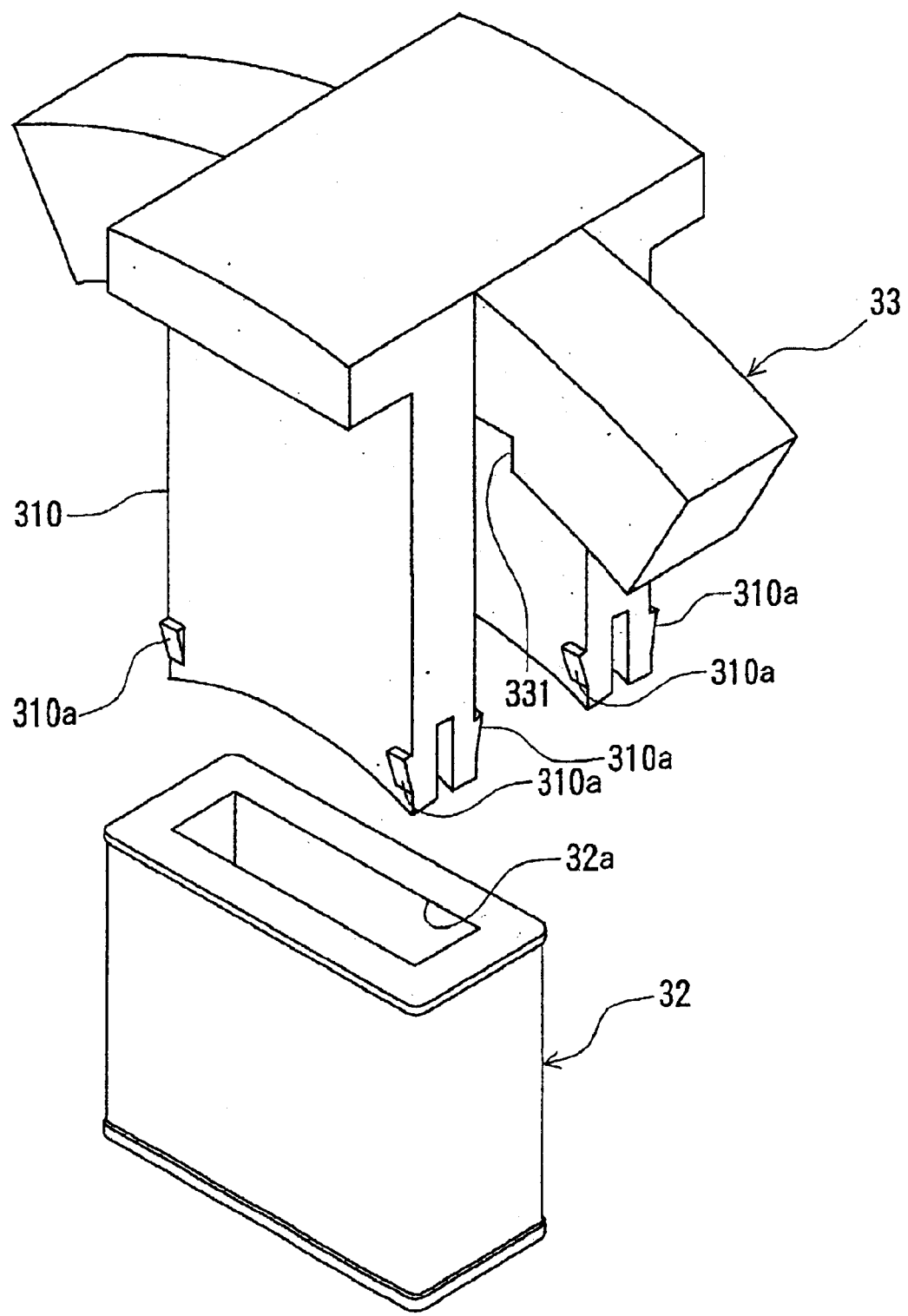
FIG. 10 is an exploded perspective view for explaining a state of assembly of the armature.

As detailedly shown in FIG. 9 and FIG. 10, the coil 32 has a box shape having a hollow portion 32a, and comprises the armature 30 by fitting this on the iron core portion 310. At the top end portion of the iron core portion 310, a projecting portion 310a is formed so as not to easily pull the coil 32 out. In the present embodiment, the coil 32 is attached to the iron core portion 310, making use of the projecting portion 310a as mentioned above. Then, the work, such as the work for drying is not necessary, different from the case where an adhesive is used so as to make the attachment work easy and so as to reduce the assembly error.

And, the shifter 3 according to the present invention has a plurality of the annular members (the shifter side base portions) 33 with the central axis CL as its center, as shown in FIG. 1 and as detailedly shown in FIG. 7. On the outer peripheral side of such annular member 33 (that is, the face of the side opposite to the side on which the permanent magnet 20 is located), six ditch portions ("outside ditch portion" hereinafter) 330 are formed at equal intervals, and the back portion 311 of the iron core member 31 is fitted in each outside ditch portion 330 from its outside (from the outside of the annular member 33), as shown in FIGS. 7 through 10. And, the outer face of the back portion 311 and an outer face 33a of the annular member 33 have the cylindrical face having almost the same curvature, as shown in FIG. 8 (that is, the back portion 311 is supported by the annular member 33 in the state of being fitted into the outside ditch portion 330 and forms a face continuous to the annular member 33.). As shown in FIG. 1, the annular member 33 is always located between the iron core portions 310, 310, but only one annular member 33 is shown for easy understanding in FIG. 7 and FIG. 8. According to the present embodiment, a plurality of armatures 30 are supported by one annular member 33 at equal intervals (that is, are symmetrically located with respect to the central axis CL) although the iron core portion 310 of the armature 30 is attracted by the permanent magnet 20 with a big force by providing so as to elongate for the permanent magnet 20 on the stator side. For this reason, the force from the armature 30 balances in the annular member 33. As the result, the annular member 33 moves along the central axis CL of the stator 2 in such a state that the distance between the annular member 33 and the stator 2 is almost constantly maintained when the shifter 3 moves (that is, together with the movement of the shifter 3). Since the back portion 311 is supported by such an annular member 33 as mentioned before, the gap between the iron core portion 310 and the permanent magnet 20 (the space between the armature 30 and the magnet 20) can be properly maintained. Even if the magnetic force of the permanent magnet 20 is strong or many armatures 30 are provided, the force can be compensated in the annular member 33, and all gaps between the iron core portion 310 and the permanent magnet 20 can be properly maintained. Since the iron core member 31 is attached to the annular member 33 making use of the outside ditch portion 330 above-mentioned, the positioning shift in the peripheral direction (the peripheral direction of the annular member 33) is made minimum and the iron core members 31 are radially accurately located (symmetrically with respect to the central axis CL), as shown in FIG. 2. Furthermore, since an adhesive is not used for attachment of the iron core member 31 to the annular member 33, the work, such as the work for drying is not necessary so as to make the attachment work easy and so as to reduce the assembly error. Besides, the shifter 3 in the present invention has a case 34 as shown in FIG. 1 and FIG. 2, and the iron core member 31, the annular member 33 and the like are stored in the case 34. So, the attachment work finishes after the iron core member 31, the annular member 33 and the like are assembled and inserting these in the case, then the assembly work is simple since the contour of these members 31, 33 is all the same in any cross section.

Furthermore, a ditch portion ("inside ditch portion" hereinafter) 331 is formed on the inner peripheral side of the annular member 33 at the position corresponding to the outside ditch portion 330, as shown in FIG. 7 and the coil 32 is fitted into such inside ditch portion 331 as detailedly shown in FIG. 9 and FIG. 10, thereby the coil 32 can be positioned. Since an adhesive is not used between the coil 32 and the annular member 33, the work, such as the work for drying is not necessary so as to make the attachment work easy and so as to reduce the assembly error. Since the coil 32 is abutted on the annular member 33 and is fitted on the iron core portion 310 by the projecting portion 310a, the annular member 33 can be prevented from being pulled out of the iron core member 31. Therefore, the assembly work of the shifter 3 can be made easier.

In the linear motor 1 according to the present embodiment, six rows of armatures 30, each row arranged in the axial direction x, are radially (to be axis symmetry) located around the central axis CL, and a space portion as shown by a mark "S" in FIG. 2 is formed between the respective armature rows. Such space portion S is formed along the axial direction x and both end portions are open, and an air goes in and out of the space portion S together with the movement of the shifter 3 in the direction x so as to cool the armature 30.

In the present embodiment, six magnets 20 are located concerning the cross section of the stator 2, but the number may be eight or ten as long as the number is an even number. In spite of the number of the magnets, as shown in FIG. 6, it is preferable to correspond the positions of both magnets being apart 180° (the permanent magnets 20a and 20d, the permanent magnets 20b and 20e, and the permanent magnets 20c and 20f in the case of the present embodiment) in the axial direction x with each other and to shift the position of one magnet in the axial direction x with respect to the magnet adjacent to one magnet in the peripheral direction (the permanent magnets 20a and 20b, and the permanent magnets 20b and 20c in the case of the present embodiment) a constant pitch $p_1$.

Since each magnet row is comprised of a plurality of permanent magnets 20 according to the present embodiment, it is easy to align the direction of magnetic flux of each permanent magnet 20 in the direction perpendicular to an installation face, and a uniform magnet row having no disorder in the magnetic flux direction can be formed.

In the above-mentioned embodiment, the stator side base portion 21 is unitedly formed by one member, but is may be formed, being divided in the axial direction or in the peripheral direction. Besides, only permanent magnets may be cylindrically located without using the stator side base portion 21.

Besides, the stator 2, the stator side base portion 21 or the magnet 20 is cylindrical in the above-mentioned embodiment, but the shape is not limited to the above. This shape may be a polygon. Furthermore, the stator 2 (the stator side base portion 21 in the concrete) is a hollow cylinder, but may be a solid bar-shape.

In the above-mentioned embodiment, the shifter in the shape of a cylinder is fitted on the stator 2 with a play, the shifter side base portion 33 is the annular member, and the distance between the shifter side base portion and the stator 2 is almost constantly maintained by locating the armatures 30 at the axial symmetry positions so as to balance the force adding on the shifter side base portion 33. But, the structure of the present invention is not limited to this arrangement, but the distance between the shifter side base portion and the stator 2 may be almost constantly maintained by another method excluding the balance of the force above-mentioned (the method in which a bearing for reciprocating motion, such as a LM guide is located between the shifter side base portion and the stator 2, for instance) even if the shifter 3 is not cylindrical or the shifter side base portion is not annular.

Subsequently, the operations of the present embodiment will now be explained.

When voltage is successively applied on the coil 32 with a predetermined timing so as to excite the armature 30, a suction force or resiliency acts between each armature 30 and each permanent magnet 20 so as to move the shifter 3 in the axial direction X of the stator 2.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Linear motor having a slender long stator, a shifter located so as to face said stator, a plurality of magnets located on a stator side and a plurality of armatures located on a shifter side so as to face said magnets, for moving said shifter along said stator by switching voltage applied on said armature, said linear motor comprising:

said shifter being in the shape of a cylinder and being fitted on said stator with a play;

a plurality of said magnets being symmetrically located with respect to a central axis of said stator;

said armatures being symmetrically located with respect to said central axis so as to respectively face said magnets;

said shifter having a support portion laterally bridged between a plurality of said armatures and a plurality of shifter side base portions being annularly formed with said central axis as its center;

said support portion being supported by said shifter side base portion so as to be located on an outer peripheral side of said shifter side base portion;

said support portion having a plurality of core portions extending from said support portion toward said central axis so that said shifter side base portions are respectively located between said core portions;

said core portion fitting a coil thereon, and said coil and said core portion comprising said armature; and said armature being located adjacent said stator side rather than said support portion and said shifter side base portion being adjacent to said stator side.

2. The linear motor according to claim 1, wherein a projecting portion is formed at a top end portion of said core portion, and said coil is held by said core portion so as not to be pulled out by said projecting portion.

3. The linear motor according to claim 1, wherein a ditch portion is formed on an outer peripheral side of said shifter side base portion, and said support portion is supported by said shifter side base portion in the state of being fitted in said ditch portion.

4. The linear motor according to claim 3, wherein said support portion forms a continuous face with said shifter side base portion by being fitted in said ditch portion.

* * * * *